Jan. 23, 1968  R. O. CORNETT  3,365,544
DIPLACUSIMETER
Filed April 14, 1964  2 Sheets-Sheet 1
Fig. 1
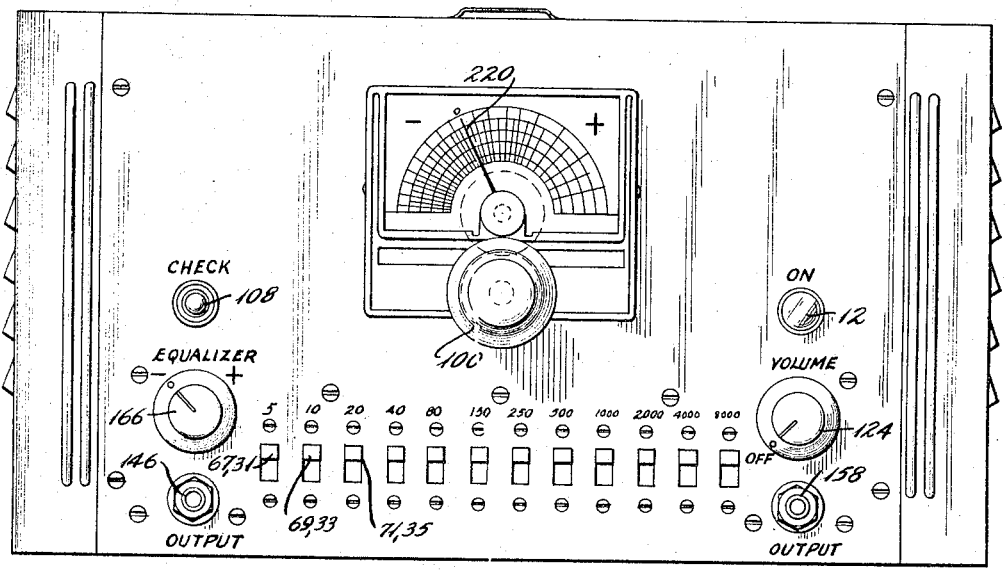
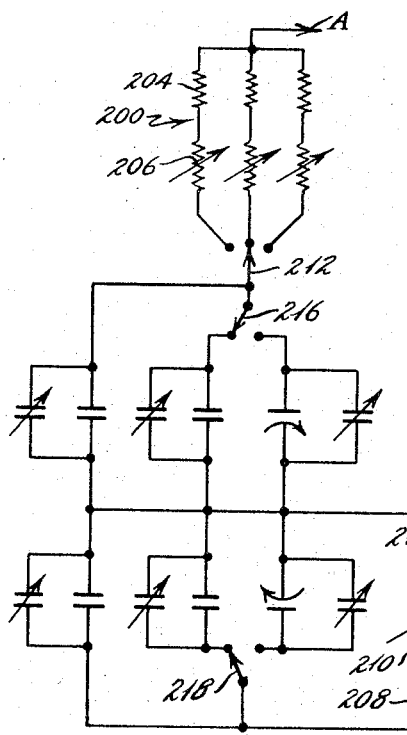
Fig. 2
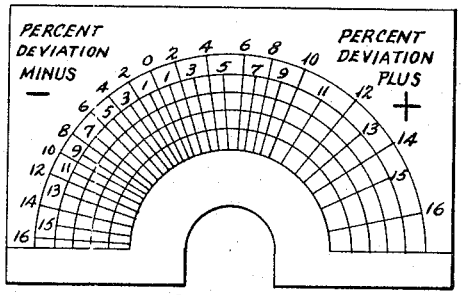
Fig. 4
Fig. 5
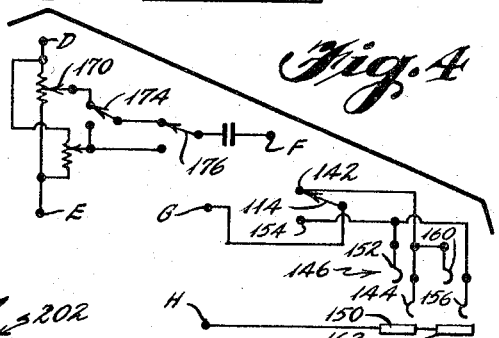
INVENTOR
R. ORIN CORNETT
BY
ATTORNEY

INVENTOR
R. ORIN CORNETT
BY
ATTORNEY

United States Patent Office 3,365,544
Patented Jan. 23, 1968

3,365,544
DIPLACUSIMETER
Richard Orin Cornett, 1629 Wrightson Drive,
McLean, Va. 22101
Filed Apr. 14, 1964, Ser. No. 359,609
19 Claims. (Cl. 179—1)

ABSTRACT OF THE DISCLOSURE

An instrument for measuring diplacusis, the hearing of a single tone as if it were two tones of different pitch, has a single oscillator circuit having a portion at a predetermined invariable audio frequency applied at a given time to one ear of a subject under test and another portion operating at an audio frequency which may be varied and applied at a time other than the given time to the other ear of the subject under test, means being supplied for indicating the ratio of the frequencies applied to the two ears. Alternatively, the instrument may be utilized to measure the diplacusis as heard by one ear only, one frequency being applied to the ear via air conduction and the other via bone conduction.

---

Figure 3:
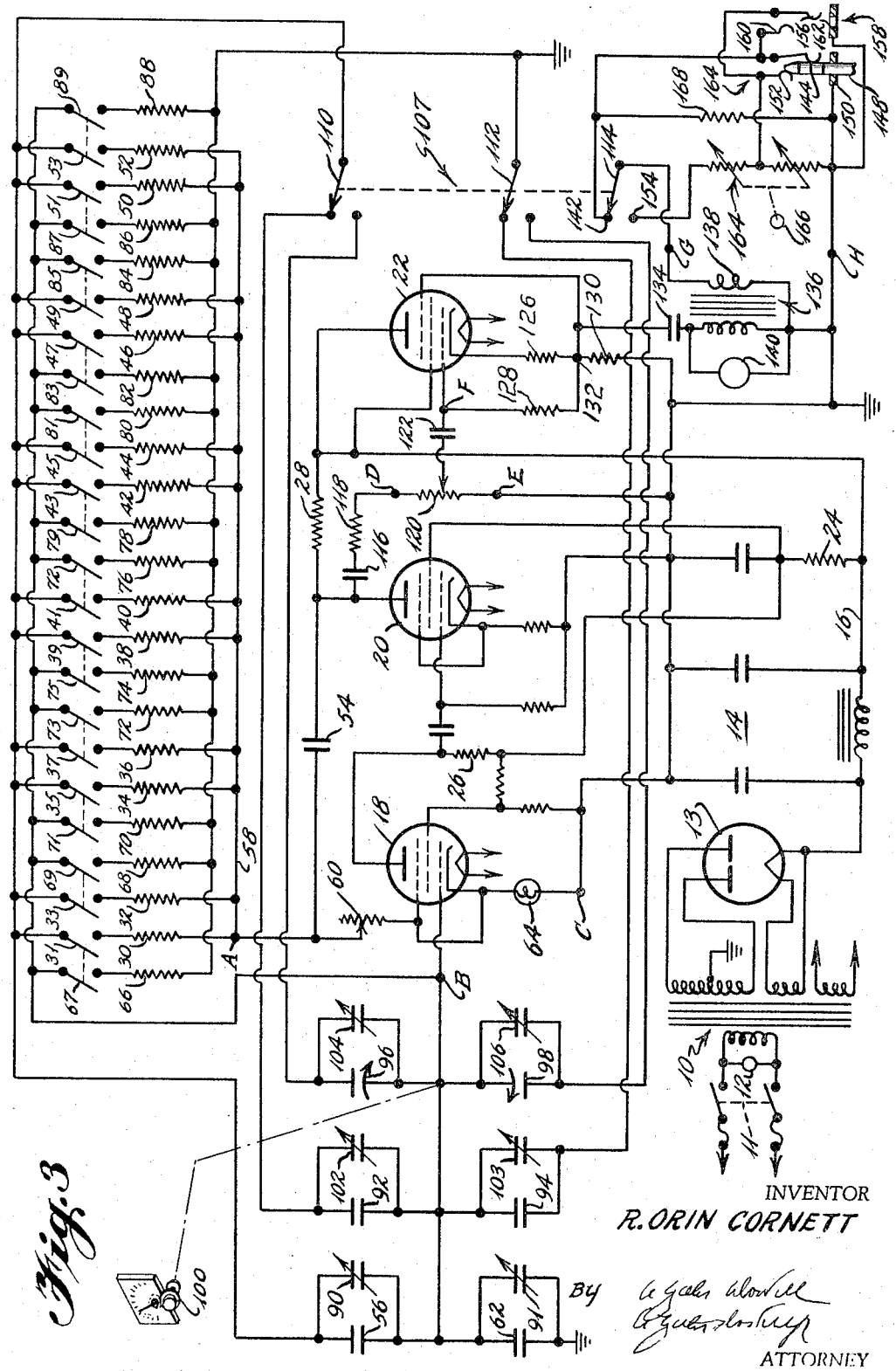

This invention relates to health or the well-being of man, as well as his enjoyment of life including the esthetic. The invention is more particularly concerned with an instrument for detecting variation in the quality of hearing of an individual's ears.

This invention relates to an instrument for measuring diplacusis, "diplacusis" being defined as "the hearing of a single tone as if it were two tones of different pitch." In particular the instrument indicates the ratio of frequencies heard alternately in his left and right ears by a subject when he adjusts the instrument to make the two frequencies sound to him as having the same pitch. Also, the instrument indicates the ratio of two frequencies heard alternately by the subject in one ear, one frequency being supplied to the ear through air conduction and one through bone conduction, as he adjusts the instrument to make them sound to him as having the same pitch. In the first case the instrument is measuring binaural diplacusis; in the second, monaural diplacusis.

Persons afflicted with diplacusis when subjected to a sound of a certain frequency will hear a pitch in one ear different from that in the other ear. The difference may be minimal or insignificant or of greater amount. While the significance of diplacusis may not be fully understood, its measurement may aid in understanding the forecasting or diagnosis of certain diseases and hearing difficulties or disturbances in an individual. A person having significant diplacusis may experience difficulty in singing on pitch or in mastering musical instruments such as the violin, in which the tone sung or played is dependent upon that person's pitch sensitivity, particularly considering both ears.

Heretofore, checking the hearing of a person for diplacusis has been difficult and time consuming. It has required the use of two highly stable precision oscillators. In the past the outputs of these have been connected separately to the two earphones. The instructor or doctor would adjust the two oscillators to have the same frequency by himself listening to the tones and varying one until it was the same as the other, by the process of eliminating the beat frequency between the oscillators. The instructor would then note the positions of the dials. The subject then would apply the earphones to his ears and attempt to set the dial of one oscillator at the position in which the tones would sound the same to him but without hearing them simultaneously. After the subject had set the dial, the instructor by noting the position of the dial could determine the error for that frequency setting. However, since the two oscillators might have varied in frequency during the test, it may have been necessary for the instructor to recheck the oscillators again to determine that the setting was still the same as that which he head previously found.

The present invention provides for the use of only a single oscillator, which need not be highly stable or accurately calibrated, though such is desirable, thereby avoiding error as the result of independent drift when two oscillators are employed. Should there be any drift in the oscillator used it will not affect the setting of the instrument nor the percentage variation which is indicated for reasons which will become apparent.

It is an object of the present invention to provide an instrument in which the degree and frequency distribution of binaural diplacusis and of monaural diplacusis as well may be accurately and easily determined.

A further object is to provide a meter for accurately measuring binaural diplacusis or monaural diplacusis which is relatively easy to use.

A still further object is to provide an instrument in which accurate audio frequencies may be easily selected and produced for the measurement of binaural or monaural diplacusis.

Yet another object of the invention is to provide an instrument in which a selected frequency standard may be produced and easily compared to a variable frequency and in which the standard and the variable frequency producing structures are combined into a single unit.

And yet another object of the invention is to provide an instrument of the character set forth wherein the frequency ratio as heard by a subject under test is independent of variations in frequency due to instability of the oscillator.

These and other objects of the invention will become apparent from the following description in conjunction with the accompanying drawing, in which FIG. 1 is a front face view of an instrument made in accordance with the invention;

FIG. 2, an enlarged view of the dial of the instrument;

FIG. 3, a circuit diagram of the instrument;

FIG. 4, a circuit diagram of a modified form of part of the oscillator circuit; and, FIG. 5, a diagram of modified portions of the output of the circuit.

Briefly stated the invention includes the use of a resistance-capacitance stabilized oscillator in which varying frequencies for purposes of testing at different frequency levels are produced by inserting different identical pairs or combinations of pairs of resistors into two resistance portions of the circuit. The capacitance portion of the circuit, in a specific aspect of the invention, includes a pair of essentially identical fixed main capacitors, each capacitor of the pair being bridged by another fixed capacitor, the bridging fixed capacitors being substantially alike. This portion of the circuit also includes a pair of substantially like variable bridging capacitors which may be substituted in the circuit for the first pair of fixed bridging capacitors by switching means. The switching means and still other switching means are arranged so that alternatively the output from the pair of main fixed capacitors and the first pair of bridging fixed capacitors is fed to one output channel and the output from the main capacitors and the pair of variable bridging capacitors is fed to another output channel. When the pair of variable bridging capacitors is adjusted so that their capacitances equal those of the fixed pair of bridging capacitors, then each output channel should have an output of the same frequency. Variation from this condition by reason of maladjustment of the pair of variable bridging capacitors by a subject under test will introduce a percentage deviation which is for a given degree of rotation of the variable bridging capacitors the same for all frequencies. The change of frequency provided by the interchangeable pairs of resistors in the oscillator circuit in all possible combinations enables a wide range of frequency selection for the oscillator. Besides the oscillator the measuring device circuit includes an amplifier and jacks for reception of transducers. These transducers are in the form of earphones which have a jack which may be plugged into the output channels from the amplifier. As a desirable refinement of the meter, the plug may be inserted in either of a pair of outlets, so that the signals to the phones may be interchanged, or reversing switch means may be employed to effect the interchange of output to the ears of the subject under test.

Now referring to the drawings in greater detail, and in particular to FIG. 3, a power transformer 10 has a primary which is fed from a house current supply, as a sixty cycles per second 120 volt line, the supply being fused and provided with a conventional line switch 11. A lamp 12 bridges the primary to indicate an "on" condition of the instrument. The secondary of the transformer feeds a conventional full wave rectifier 13 and pi filter 14, so that high voltage direct current is fed to line 16. Separate low voltage windings are shown in the transformer to supply appropriate filament voltages to the rectifier tube 13, to the oscillator tube 18, feed back amplifier and phase shift tube 20, and audio output tube 22.

The high voltage line 16 supplies the voltages to the several anodes of the oscillator, feedback amplifier tube, and audio output tube, full rectified voltage being supplied to the audio output tube 22, and the voltages to the other tubes being diminished by the interposition of resistors 24 and 26 in the lead to the anode of the oscillator and the interposition of resistor 28 in the lead to the anode of the feedback amplifier tube 20.

The meter, as stated heretofore, incorporates an oscillator, which may be of any type using resistances and capacitances for frequency determination. However, the more stable the oscillator the better, and for the purposes of this invention the stabilized resistance-capacitor type of oscillator here disclosed has been found to be suitable. The incorporation of this oscillator into the circuit is now described.

In FIG. 3 there is depicted a group of parallel resistors 30, 32, 34, 36 . . . 52 each having a switch 31, 33, 35 . . . 53 in series with a resistor to permit connecting the resistors in or out of the circuit. Voltage is applied to the resistors via capacitor 54 as feedback from the anode circuit of tube 20.

In series with this group of resistors is a fixed capacitor 56 and the control grid of oscillator tube 18. The resistors are also connected via a line 58 and potentiometer 60 to the cathode and suppressor grid of the oscillator tube. A second fixed capacitor 62 of the same capacity as capacitor 56, is connected between the grid of tube 18 and ground.

The cathode of tube 18 is connected to ground via an amplitude controlling lamp 64 acting as a thermistor. The control grid of the tube is also connected to a second group of parallel resistances and series connected switches indicated as resistors 66, 68 . . . 88 and switches 67, 69 . . . 89, these resistors being of the same value, pair for pair, for example, resistors 30 and 66, as in the first group of resistors, each resistor in the groups being a precision resistor of different value so as to predetermine the frequency of oscillation of the oscillator when coupled with the capacitors hereinbefore described and with other capacitors, which will be described. Each switch of one group is coupled for joint operation with a corresponding switch of the other group, as for example switches 31 and 67, so that if resistor 30, for example, be cut into the circuit, so will resistors 66 be inserted into the circuit.

Coupled with the oscillator tube is the feedback amplifier 20. The oscillator circuit disclosed to this point, save for the multiplicity of resistors and switches in the groups of resistors, and the feature wherein capacitance means are switched into the circuit alternatively, and the theory of its operation are disclosed in Terman-Radio Engineers' Handbook, a McGraw-Hill Book Company, Inc. publication, published in New York and London and, in the 1943 edition, will be found on pages 504, 505 and 506.

The oscillator circucit disclosed in Terman is not only modified by the addition of the groups of resistances and their switches and the interchange of fixed and variable capacitors but also by the incorporation of the following features: Across at least one of the capacitors 56 and 62 is placed a variable trimming capacitor 90 or 91. In practice, the capacitor 56 is actually chosen to be enough larger than capacitor 62 that the wiring and other distributed capacitances in the circuit, which are larger across capacitor 62 than capacitor 56, make the combined capacitances of the two with their respective circuit capacitances approximately equal, the difference then being compensated precisely by use of the trimming capacitance 90 or 91. Also in the circuit are two fixed capacitors 92 and 94 and two variable capacitors 96 and 98. The capacitors 92, 94, 96 and 98 are so chosen that when capacitors 96 and 98 are at their mid-positions, the capacitances of all four capacitors are alike and are further so chosen that capacitors 96 and 98 will vary in like manner, these last two capacitors being ganged together and connected to a control knob 100 on the panel, see also FIG. 1. In order to compensate for lack of uniformity in capacity of capacitors 92 and 94, at least one of them is supplied with a variable trimmer capacitor, as capacitor 102 or 103, and in order to secure parallel values in capacitors 96 and 98 with each other and with the capacitors 92 and 94, each capacitor 96 and 98 is provided with a variable trimming capacitor, indicated at 104 and 106.

A triple pole double throw manually operated switch or equivalent ganged switch 107 is provided in the instrumentality, the handle of which is indicated at 108 in FIG. 1. Two of the poles of the switch are indicated in the schematic drawing in FIG. 3 as 110 and 112, forming part of the oscillator network. The third pole is indicated in the schematic drawing as 114. The function of the pole 114 will be described later.

Switch pole 110 is in series with the group of paralleled switches 31 . . . 53 and with the paralleled capacitors 56 and 92 in one position of the switch or with capacitors 56 and 96 in the other position of the switch. Switch pole 112 is in series with the paralleled resistors 66 . . . 88 and series connected switches 67 . . . 89 and with the paralleled capacitors 62 and 94 in one position of the switch pole and with the paralleled capacitors 62 and 98 in the other position of the pole. When the poles are in the upper position, the frequency of the oscillator is fixed in part by the fixed capacitors 56, 62, 92 and 94 and in part by the selected precision resistors in the two groups of resistors. When the poles are in the lower position, the frequency of the oscillator is in part under control of the variable capacitors 96 and 98, as adjusted by rotation of the control knob 100.

The switch pole 114 is connected in the circuit so that oscillator frequency is impressed on one ear only of a subject when the switch poles 110 and 112 are in the upper position, and the switch pole 114 is connected so that oscillator frequency is impressed on the other ear only of a subject when the poles 110 and 112 are moved into the lower position. The control of the three pole switch indicated at 108 in FIG. 1, is in the form of a lever normally biased by the spring contacts of the three pole switch to the position shown in FIG. 3 and shiftable against spring bias to connect the poles with the opposite contacts.

The output from the oscillator-feedback amplifier combination is fed to the grid of audio output tube 22 via a capacitor 116, fixed resistor 118, volume control potentiometer 120 as initially set by knob 124 in original calibration of the instrument, and capacitor 122. The audio amplifier or rather audio output tube is of the cathode follower type, there being provided in the circuit a self-biasing resistor 126 and grid leak resistor 128 as well as the bias creating resistor 130 for the cathode follower connection at 132. The signal appearing at 132 is fed via a capacitor 134 to the primary of a transformer 136 whose low voltage high current secondary 138 is connected to the pole 114 of the three pole double throw switch previously referred to. A meter 140 may bridge the primary of transformer 136 to indicate the voltage thereacross, and therefore the sound intensity in the earphones. One contact 142 of the switch is connected to the long spring contact 144 of jack 146.

A plug 148 with three segments insulated from each other may be plugged into the jack, and, when so plugged in, current will flow from the spring contact 144 into the mid-sleeve section of the plug, through one only of the phones, as on the left ear of a subject, and back to grounded ring 150 of the jack. The short spring contact 152 of the jack contacts the plug tip which is connected to the other phone, on the right ear, and to the grounded ring 150, but no current, in the position shown of pole 114, flows through the right earphone. When the pole 114 is thrown to energize contact 154 of the switch, current will be fed to the short spring contact 152 and to the right earphone, but not to the left earphone.

Short spring contact 152 of jack 146 is connected with long spring contact 156 of a second jack 158, while long spring contact 144 of jack 146 is connected to the short spring contact 160 of jack 158. The ground ring 162 of jack 158, like ring 150 of the other jack, is connected to ground. Thus with the switch pole 114 in the unchanged position shown, sound may be heard in the left ear when the plug is inserted in the left jack and in the right ear when the plug is inserted in the right jack. Reverse conditions will ensue when the switch pole 114 is shifted to the lower position.

In order to equalize the intensity of the signal to both ears of a subject, an equalizing L-pad 164 is provided with a control knob 166 on the panel to adjust the resistors of the pad, one resistor increasing linearly in value as the other decreases in order to impose a constant load on the transformer output regardless of signal distribution to the two phones. A resistor 168 is shunted across the terminal of jack 146 and ground to balance out the total resistance of the L-pad at maximum volume setting.

In a modification of the invention, see FIG. 4, the L-pad 164 and compensating resistor 168 are dispensed with. In effect, the parts connected to points G and H in FIG. 4 are substituted for the parts in FIG. 3 connected to points G and H. Also the volume control parts connected between points D, E and F in FIG. 3 are replaced by the dual volume control and shift switches in FIG. 4. In the modification of FIG. 4 there are two volume controls 170 and 172 each independently adjustable and switching means comprising a switch 176 (operated in coordination with switches 110, 112 and 114 as a quadruple pole double throw switch) to connect the movable tap of each volume control alternatively to the grid of the cathode follower tube, that is to say, the audio output tube, thus allowing the volume of output to each ear to be controlled separately. Switch 174, when moved to the down position, negates this effect and causes the intensities of the tones to both ears to be the same, controlled by potentiometer 172 alone rather than by potentiometers 170 and 172 separately. Switch 174 and potentiometer arm 170 may be coupled together as is conventional for a combined switch and potentiometer in a radio set, so that when potentiometer 170 is at "OFF," switch 174 is in the down position, but when potentiometer 170 is activated, switch 174 moves to the up position putting poentiometer 170 into the circuit with one terminal of switch 176. On the panel of FIG. 1, the control knob 166 would be used to control potentiometer 170, and the control knob 124 to control potentiometer 172, which is the equivalent of potentiometer 120 in FIG. 3.

A further modification may be made with respect to the selection of frequencies to be impressed on the earphones. In the form of invention shown in FIG. 3 there are illustrated twelve groups of pairs of resistors and twelve dual switches to connect a selected pair of resistors into the oscillator circuit. Note that switches 67, 31 are ganged together as are switches 69, 33; 71, 35, etc. The values of precision resistors are so chosen that more than 3,000 separate and equally spaced frequencies can be developed through the audible range of the human ear. The values are so chosen that using pairs of resistors in combination produces in each case a frequency equal to the sum of the frequencies produced by the several pairs used singly. It is preferred that the lowermost frequency provided be at 5 cycles per second and that other frequencies be made available as indicated in FIG. 1 so that any multiple of 5 cycles per second up to 16,000 cycles per second be made available. The groups of resistors and switch pairs may be replaced by the resistances and switches shown in FIG. 5 to provide continucus adjustment of frequency throughout the audible range in two or more subranges.

The capacitor organization in FIG. 5 is the same as that disclosed in FIG. 3. However, instead of the groups of resistors and switches of FIG. 3 there is employed an upper group or bank of resistors 200 and a lower group or bank of resistors 202. The resistors of the upper bank may comprise three sets of resistors, each set comprising a series connected resistor, as resistor 204, and potentiometer 206, the resistance of successive sets of a bank increasing in value so as to vary the frequency output of the oscillator well over the audio range. The lower bank of resistors is similar to the upper bank with resistors 208 and potentiometer 210 matching the resistor 204 and potentiometer 206, the middle series connected sets being of the same values and the right-hand outer sets being of the same values. The potentiometers are utilized to set the values of the resistors to attain any desired values, and precision resistors need not be used. The switch poles 212 and 214 are tied together for conjoint operation as are the switch poles 216, 218 and the switch pole 114.

The control knob 100 on the panel, through a reduction gearing, operates a pointer 220 which will move over a scale. The scale is preferably set with a 0 center and graduations — and + with reference to the left and right of the null point. When the frequencies applied to the earphones are actually the same, the needle is set to the null point. The indications to the right and left are then made equal to the percentage by which the frequencies applied to the two phones differ, i.e. the percentage difference between the two phones as shown on the dial. Since it is intended that the subject shall operate the knob 100, it may be desirable during manipulation of the knob by the subject under test to blank out the pointer and scale on the front of the instrument as by throwing a screen over the face of the instrument, and to lift the screen after a setting has been made by the subject, or to place the pointer and dial on the rear of the instrument where the subject cannot view the indicator but the person supervising the test at the rear of the instrument may see the same.

In use of the instrumentality shown in FIGS. 1 and 3, the switch 11 is turned on. A subject applies the earphones to his ears and inserts the plug into one of the jacks. A selected switch pair lever, as 67, 31, or any number of them, is then operated to cause the oscillator to function at a desired frequency. Then the volume control knob 124 is operated to attain the desired general level of sound. Next the check or reversing lever 108 is held down while the equalizer knob 166 is operated to attain equal sound levels in the ears of the subject. The subject may alternate the positioning of the plug in the jacks to, in effect, interchange the ear phones. These last actions in themselves will aid the subject in determining the relative sensitivity of his ears.

After adjusting the controls to obtain equal sound levels in his ears, the subject by operation of check lever 108 and knob 100 will adjust the frequency response of the instrument to equalize the pitch as the subject senses the same. For actual identical frequencies applied to the two phones the dial reading indicator 220 operated by reduction gearing from the knob 100 will be 0 on the dial. Deviations + or − from the identical frequencies are indicated in percentages on the dial, the dial reading to 16% in either direction, or to any desired percent.

Use of the modified forms of invention is apparent from the previous description.

In a modification of the instrument, achieved by using smaller values of capacitors 92 and 94 in proportion to capacitors 96 and 98, larger deviations are achieved in one direction (say, plus) than in the other. Also, by reducing capacitors 56 and 62 in proportion to 96 and 98, greater deviations may be secured in both directions. By a combination of these two modifications, for example, deviations may be obtained for a particular instrument, from 20% in the negative direction to 60% in the positive direction, or even greater.

While I have shown several embodiments of the invention it is apparent that various other embodiments and changes may be made in the structure of the instrument such as the subject varying the resistances of the oscillator circuit rather than the capacitors, or replacing the vacuum tubes with transistors or other solid state devices, and still fall within the purview of the appended claims or fair equivalents thereof.

What is claimed is:

1. A diplacusimeter comprising an oscillator circuit having first and second outputs, said circuit being normally connected to said first output, said oscillator being of the resistance capacitance stabilized type, said oscillator circuit including a pair of capacitance means and a pair of resistance means, said capacitance means including fixed main capacitance means, fixed secondary capacitance means, and variable secondary capacitance means, switching means for alternatively connecting either of said secondary capicitance means in parallel with the main capacitance means while simultaneously switching the output of said oscillator circuit from said first output to said second output, said resistance means including a plurality of resistors, and switching means for connecting selected combinations of resistors into the oscillator circuit, and means for indicating the percentage difference between the two frequencies appearing at the outputs.

2. A diplacusimeter comprising an oscillator circuit having first and second outputs, said oscillator circuit including a plurality of pairs of resistors of different values, switching means for selectively connecting any of said pairs of resistors into the oscillator circuit, first and second pairs of capacitance means, switching means for selectively connecting said first pair or said second pair of capacitance means into said oscillator circuit, said first pair of capacitance means having a preset constant value, said second pair of capacitance means being variable at will, the capacitance switching means alternatively connecting said first and second outputs to the oscillator circuit in accordance with whether the first or the second capacitance means is in the circuit, whereby a selected pair of resistors may be placed in the circuit with the first pair of capacitance means to produce a selected audio frequency at the first output and the switching means being operable so that the audio frequency to the second output may be varied by the second pair of capacitance means and compared to the frequency produced at the first output, and means for indicating the percentage differences between the two frequencies appearing at the outputs.

3. The structure of claim 2 in which the means are a dial having indicia and a pointer cooperating therewith, the pointer being connected for movement with the adjustment of the second pair of capacitance means, and the indicia on the dial indicating percentage differences between the two frequencies appearing on the outputs.

4. The structure of claim 2, in which a number of resistors are variable.

5. The structure of claim 2, in which the switching means includes means for reversing the circuit so that the frequency applied to the first output is in circuit with the pairs of fixed capacitance means and the frequency to the second output is in circuit with the pair of variable capacitance means.

6. A diplacusimeter for comparing the pitch responses of the ears of a subject, said meter comprising a single oscillator circuit, means for applying at a given time the output of said oscillator circuit in audio form to one ear of the subject at a determined and invariable frequency, means for applying at an alternative time the output of said oscillator circuit in audio form to the second ear of said subject, means under control of the subject for enabling the frequency output to said second ear to be varied at will from the predetermined frequency, and means for indicating the ratio of the frequencies applied to the two ears.

7. The structure of claim 6 in which the means for varying the frequency output includes a plurality of resistances of different value, and switching means is provided to obtain, at will, various combinations of resistances to vary the frequency of the oscillator circuit.

8. The structure of claim 6 wherein the oscillator circuit includes fixed capacitor means and variable capacitor means, each bridged by variable capacitors.

9. The structure of claim 6 in which the oscillator circuit includes resistance means, each said resistance means including a pair of resistors in series, one of said resistors of the pair being variable.

10. The structure of claim 6 in which additional means are provided in the oscillator circuit output for adjusting the volume of sound applied to at least one ear.

11. The structure of claim 6 in which means are provided for adjusting the volume of sound independently applied to each ear.

12. The structure of claim 6 in which the output from said oscillator circuit includes a jack with a short and long spring arm contact and a ground ring, said short contact and ground ring being adapted to conduct current through a plug to an earphone and said long contact and ground ring being adapted to conduct current through the same plug to a second earphone.

13. The structure of claim 12 in which a second identical jack is provided, the short contact of the second jack being connected to the long contact of the first jack and the long contact of the second jack being connected to the short contact of the first jack.

14. A diplacusimeter as defined in claim 6 in which the means under control of the subject for enabling the frequency output to the second ear to be varied at will comprises variable capacitor means in the oscillator circuit.

15. A diplacusimeter as defined in claim 14 in which resistor means differing in value are provided and switching means is provided for incorporating a selected resistor means into the oscillator circuit to vary the frequency of the circuit.

16. The structure of claim 14 in which the variable capacitor means is interchangeable in the oscillator circuit with fixed capacitor means, both the variable capacitor means and the fixed capacitor means being connectible interchangeably in parallel with another fixed capacitor means always in the oscillator circuit.

17. A diplacusimeter for comparing the pitch responses of the ears of a subject, said meter comprising a single resistance-capacitance oscillator circuit, a fixed capacitor means, a variable capacitor means which in an intermediate position of adjustment has the same value as the fixed capacitor means, switching means for alternatively coupling the fixed and variable capacitor means into the oscillator circuit, sound transducers, one for each ear of a subject, a switch ganged for operation with the switching means for coupling the output of the oscillator circuit with a selected one only of the sound transducers, one sound transducer responding to the output of the oscillator circuit when the fixed capacitor means is in the circuit and the other when the variable capacitor means is in the circuit, and means for indicating the position assumed by the variable capacitor means when the subject adjusts the same.

18. A diplacusimeter for comparing the pitch responses of the ears of a subject, said meter comprising a single oscillator circuit, means for applying at a given time the output of said oscillator circuit in audio form to one ear of the subject at a determined and invariable frequency, means for applying at an alternative time the output of said oscillator circuit in audio form to the second ear of said subject, means under control of the subject for enabling the frequency output to said second ear to be varied at will from the predetermined frequency, and means for indicating the ratio of the frequencies applied to the two ears, the output from said oscillator circuit including a jack with a short and long spring arm contact and a ground ring, said short contact and ground ring being adapted to conduct current through a plug to an earphone and said long contact and ground ring being adapted to conduct current through the same plug to a second earphone, said earphones being right and left earphones in the measurement of binaural diplacusis.

19. A diplacusimeter for comparing the pitch responses of the ears of a subject, said meter comprising a single oscillator circuit, means for applying at a given time the output of said oscillator circuit in audio form to an ear of the subject at a determined and invariable frequency, second means for applying at an alternative time the output of said oscillator circuit in audio form to the same ear of said subject, means under control of the subject for enabling the frequency output of said second means to be varied at will from the predetermined frequency, and means for indicating the ratio of the frequencies applied to the ear, the output from said oscillator circuit including a jack with a short and long spring arm contact and a ground ring, said short contact and ground ring being adapted to conduct current through a plug to an earphone and said long contact and ground ring being adapted to conduct current through the same plug to a second earphone, said earphones being respectively an air conduction transducer and a bone conductor transducer for the same ear in the measurement of monaural diplacusis.

References Cited
UNITED STATES PATENTS

| | | | |
|---|---|---|---|
| 2,619,534 | 11/1952 | Payne | 331—137 |
| 3,054,855 | 9/1962 | Hyman | 179—1.7 |
| 2,869,666 | 1/1959 | Webster | 179—1.7 |

KATHLEEN H. CLAFFY, *Primary Examiner.*

R. P. TAYLOR, *Assistant Examiner.*